US008540367B2

(12) United States Patent
Dubois et al.

(10) Patent No.: US 8,540,367 B2
(45) Date of Patent: Sep. 24, 2013

(54) METHOD OF SELECTING A SEMI-FINISHED OPHTHALMIC LENS ACCORDING TO A GIVEN SPECTACLE FRAME

(75) Inventors: Frédéric Dubois, Charenton-le-Pont (FR); Cécile Pietri, Charenton-le-Pont (FR); Pauline Colas, Charenton-le-Pont (FR); David Freson, Charenton-le-Pont (FR)

(73) Assignee: Essilor International (Compagnie Generale D'Optique), Charenton le Pont (FR)

( * ) Notice: Subject to any disclaimer, the term of this patent is extended or adjusted under 35 U.S.C. 154(b) by 22 days.

(21) Appl. No.: 12/811,043

(22) PCT Filed: Dec. 23, 2008

(86) PCT No.: PCT/EP2008/068275
§ 371 (c)(1),
(2), (4) Date: Jun. 28, 2010

(87) PCT Pub. No.: WO2009/065965
PCT Pub. Date: May 28, 2009

(65) Prior Publication Data
US 2010/0283965 A1 Nov. 11, 2010

(30) Foreign Application Priority Data
Dec. 28, 2007 (EP) .................................... 07301758

(51) Int. Cl.
*G02C 13/00* (2006.01)

(52) U.S. Cl.
USPC ...................................... 351/178; 351/159.73

(58) Field of Classification Search
USPC ................... 351/41, 159, 168–172, 177, 178, 351/159.01, 159.41–159.46, 159.73–159.76; 705/26.5
See application file for complete search history.

(56) References Cited

U.S. PATENT DOCUMENTS

| 4,524,419 A | 6/1985 | Headlund et al. |
| 4,630,906 A | 12/1986 | Bammert et al. |
| 5,485,399 A | 1/1996 | Saigo et al. |
| 5,790,232 A * | 8/1998 | Hagiwara et al. ............ 351/177 |
| 6,637,880 B1 * | 10/2003 | Yamakaji et al. ............ 351/177 |
| 6,817,713 B2 * | 11/2004 | Ueno ........................... 351/177 |
| 2002/0176052 A1 | 11/2002 | Ueno |
| 2003/0137634 A1 | 7/2003 | Dungar et al. |
| 2007/0242220 A1 | 10/2007 | Guilloux et al. |
| 2009/0125137 A1 * | 5/2009 | Allione et al. ................ 700/97 |

FOREIGN PATENT DOCUMENTS

| EP | 0 061 918 | 10/1982 |
| WO | WO 2007/017766 | 2/2007 |

* cited by examiner

*Primary Examiner* — Darryl J Collins
(74) *Attorney, Agent, or Firm* — Cozen O'Connor

(57) ABSTRACT

A method of selecting a semi-finished ophthalmic lens according to a given spectacle frame comprising the steps of: providing the spectacle frame front face base data providing a list of semi-finished ophthalmic lenses with a plurality of front face bases, and selecting from the list of semi-finished ophthalmic lenses the semi-finished ophthalmic lens whose front base is the closest from the front base of the spectacle frame.

24 Claims, 3 Drawing Sheets

METHOD OF SELECTING A SEMI-FINISHED OPHTHALMIC LENS ACCORDING TO A GIVEN SPECTACLE FRAME

RELATED APPLICATIONS

This is a U.S. national stage of application No. PCT/EP2008/068275, filed on Dec. 23, 2008.

This application claims the priority of European application no. 07301758.4 filed Dec. 19, 2007, the entire content of which is hereby incorporated by reference.

FIELD OF THE INVENTION

The invention relates to a method of selecting a semi-finished ophthalmic lens according to a given spectacle frame.

BACKGROUND OF THE INVENTION

Conventionally, spectacle lenses are manufactured on request in accordance with specifications intrinsic to individual wearers. However lenses are commonly manufactured by using a limited number of semi-finished lens blanks. A semi-finished lens blank has a front face and a rear face.

In the frame of the present invention and according to ISO Standard 13666:1998(E/F) (Ophthalmic optics-Spectacle lenses-Vocabulary), the curvature of the front face is called a "base-curve".

The front face of a semi-finished lens blank is usually intended to be the final front surface of the final lens and the other face is machined so as the optical system of the final lens fits the wearer ophthalmic prescriptions. Some minor machining of the front face may occur, but without modifying its curvature.

Semi-finished lens blanks are usually obtained by injection moulding or by casting into moulds. They also can be produced by machining a blank.

Manufacturers typically produce a series of semi-finished lens blanks, each having its own base curve. This "base-curve series" is a system of semi-finished lens blanks that front faces increase incrementally in curvature (e.g., +0.50 D, +2.00 D, +4.00 D, and so on).

The front surface of a semi-finished lens blank of a base-curve series serves as the starting point from which the optical surface of the back surface will be calculated and the final lens be manufactured according to a wearer prescription (or focal power).

The front surfaces of the semi-finished lens blanks of a "base-curve series" may be spheres, aspheric surfaces, progressive addition surfaces.

As for an example, progressive addition lenses (PAL) may be manufactured thanks to semi-finished lens blanks with spherical or aspheric front surfaces and the progressive addition surface is machined to form the rear face of the final lens. They can also be manufactured thanks to semi-finished lens blanks with progressive addition surfaces and the rear face of the blank is machined so as to form a spherical or toric surface. It is also possible to manufacture progressive lens thanks to semi-finished lens blanks with progressive addition surfaces and to machine the rear face of the lens blank so as to obtain a second progressive addition surface and provide "dual add" PAL.

Each base-curve in a series is conventionally used for producing a range of prescription, as specified by the manufacturer. Manufacturers use base-curve selection charts that provide the recommended prescription ranges for each base-curve in the series. An example of a typical base-curve selection chart is disclosed in patent document U.S. Pat. No. 6,948,816 where the base-curve series of FIGS. 23 A to C comprises five base-curves. The selection chart indicates the unique base-curve to be chosen according to a given prescription as a function of the spherical power SPH and of the cylindrical power CYL for curing an astigmatic vision. The disclosed selection chart relates to progressive addition lenses (PAL) in which a power continuously changes between a distance portion and a near portion. The same type of selection chart is widely used for every kind of ophthalmic lenses such as for example single lenses (spherical and/or torical), bi-focal lenses, aspherical lens, PAL.

The common trend is to limit the number of base-curves of a base-curve series in order to minimize the mould number, the stocking costs and inventory requirements. A standard base-curve series comprises less or equal to twenty base-curves, as for example equal or less or equal to ten, and preferably five to eight base-curves.

Usually, a person needing to wear spectacles and having thus a prescription filled by an ophthalmologist or by another authorized eye care professional goes to the premise of an optician. The optician or the lens provider, on the basis of the aforesaid prescription, firstly determines the semi-finished lenses suiting the best the prescription and, in a second time, advises the future wearer to choose a spectacle frame amongst a limited choice of frames adapted to the pair of lenses.

Usually, the selection of the semi-finished lens is based on optical criteria, such as the wearer prescription, optical comfort and the measured parameter of the spectacle frame are used for the edging and beveling steps.

In the sense of the invention a step of cutting the lenses according to a spectacle frame shape is called "edging" and a step of forming a bevel on an external edged of the lens is called "beveling."

Some future wearers of spectacles are incited to choose the best looking frame rather than the pair of lenses suiting the best their prescription. These future wearers can be thus frustrated for being proposed such a limited choice of frames.

One object of the present invention is to improve the situation.

SUMMARY OF THE INVENTION

To this end, one aspect of the present invention is directed to a method of selecting a semi-finished ophthalmic lens according to a given spectacle frame comprising the steps of
  providing the spectacle frame front face base data
  providing a list of semi-finished ophthalmic lenses with a plurality of front face bases, selecting from the list of semi-finished ophthalmic lenses the semi-finished ophthalmic lens whose front base is the closest from the front base of the spectacle frame.

It will be thus understood that, on the contrary of the prior art approach, the chosen frame is an input data of the method, while the suitable lens is an output data.

The future wearer may choose the best looking frame and the lens provider is able to select a suitable suiting both the wearer prescription and the frame choice.

According to another aspect, the invention relates to a method of calculating an optical system (OS) of an ophthalmic lens according to a given spectacle frame comprising the steps of:
  providing wearer data,
  selecting a semi-finished ophthalmic lens according to the method of selection of the invention, optimization of the optical system (OS) according to at least the criteria consisting of the wearer data, so as to generate at least a second optical surface different from the front surface of the ophthalmic lens.

According to further embodiments which can be considered alone or in combination:

during the optimization step edging parameter are generated;

before the optimization step the method further comprises a step of providing deformability data of the spectacle frame, and the optimization step further comprises a step of optimization of edging parameter according to at least the criteria consisting of the geometrical and deformability data of the spectacle lens and the wearer data;

the geometrical data of the spectacle frame includes the curve $C_1$ in diopter of the front surface of a spectacle lens, the deformability data of the spectacle frame includes the deformability coefficient $C_d$ in diopter of the spectacle lens, the front surface base corresponds to a curve $C_1$ in diopter, and the edging parameter include at least a calculated bevel respecting: $|C_b-C_f| \leq C_d$, with $C_b$ the curve of the bevel in diopter;

the bevel is calculated with respect to an edge of the spectacle lens according to a specified design mode and the curve of the bevel being:

$$C_b = C_f \text{ when } |C_f - C_f| \leq C_d$$

$$C_b = C_f - C_d \text{ when } |C_f - C_f| > C_d \text{ and } C_f - C_f < 0$$

$$C_b = C_f + C_d \text{ when } |C_f - C_f| > C_d \text{ and } C_f - C_f > 0;$$

before the optimization step the method further includes a step of providing an edging mode;

the at least one generated optical surfaces is the rear surface of the ophthalmic lens;

the at least one generated optical surfaces is a layer surface between the front and rear surface of the spectacle ophthalmic lens;

the optimization criteria further comprises the index of refraction of the optical system (OS);

the geometrical data are obtained by measuring a spectacle frame;

the geometrical data are obtained from a spectacle frame data base;

the geometrical data comprise contour parameters and a reference shape;

the geometrical data comprise 3 dimensional data of the spectacle frame;

the geometrical data comprise 2 dimensional data of the spectacle frame and curve data of the spectacle frame;

the geometrical data comprises an internal contour data of the rim of the spectacle frame;

the geometrical data of the spectacle lens further comprise geometrical data of the front face of the spectacle lens;

the optimization criteria further comprises the thickness of the spectacle lens;

the ophthalmic lens is a progressive ophthalmic lens;

the ophthalmic lens is a monofocal ophthalmic lens;

the ophthalmic lens is a multifocal ophthalmic lens;

the optical system (OS) is identified by a optical function (OF), at least two optical surfaces comprise a first optical surface (S1) defined by a first equation (ES1) and a second surface (S2) defined by a second equation (ES2), the optimization step further comprises:

a generating step (GEN), in which a virtual optical system (VOS) is used to generate a virtual function (VOF);

a modification step (MOD), in which the virtual function (VOF) is modified so as obtain the function (OF);

a calculation step (CAL), in which the second equation (ES2) is calculated from the function (OF), and the first equation (ES1).

According to another aspect, the invention relates to an ophthalmic lens manufacturing method comprising the steps of:

receiving geometrical data of a spectacle frame, receiving an optical system (OS) of an ophthalmic lens data calculated using a method according to the invention, manufacturing the calculated ophthalmic lens.

The calculation can be done at the manufacturer side and the receiving can be an internal receiving.

According to further embodiments which can be considered alone or in combination:

the spectacle frame is selected at a lens order side and the geometrical data are transmitted to a computing device installed at a lens manufacturer side where the calculation steps are processed;

the spectacle frame is selected at a lens order side and after being manufactured at a lens manufacturer side, the ophthalmic lens is transmitted to the order side with edging parameters;

the spectacle frame is selected at a lens order side and after being manufactured at a lens manufacturer side, the ophthalmic lens is edged and the edged ophthalmic lens is sent to the order side;

the manufactured spectacle lens when edged is fitted in the selected spectacle frame;

The invention also relates to an ophthalmic lens ordering method comprising the steps of:

selecting a spectacle frame, ordering at a lens manufacturer an ophthalmic lens manufactured according to the invention, fitting the edged ophthalmic lens in the selected spectacle frame.

The ordering method may further comprise an edging step of the ophthalmic lens done at the order side.

According to another aspect, the invention relates to a computer program product comprising one or more stored sequence of instruction that is accessible to a processor and which, when executed by the processor, causes the processor to carry out at least one of the steps of at least one of the method according to the invention.

Another aspect of the invention relates to a computer readable medium carrying one or more sequences of instructions of the computer program according to the invention.

Unless specifically stated otherwise, the cross-section of a rim of a spectacle frame is to be understood as according to a plane comprising the barycentric center of the rim of the spectacle frame.

Unless specifically stated otherwise, the cross-section of an ophthalmic lens is to be understood as according to a plane comprising the barycentric center of the ophthalmic lens.

Unless specifically stated otherwise, the wording "optician" is to be understood as well as eye care professional.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings wherein.

Figure 1:
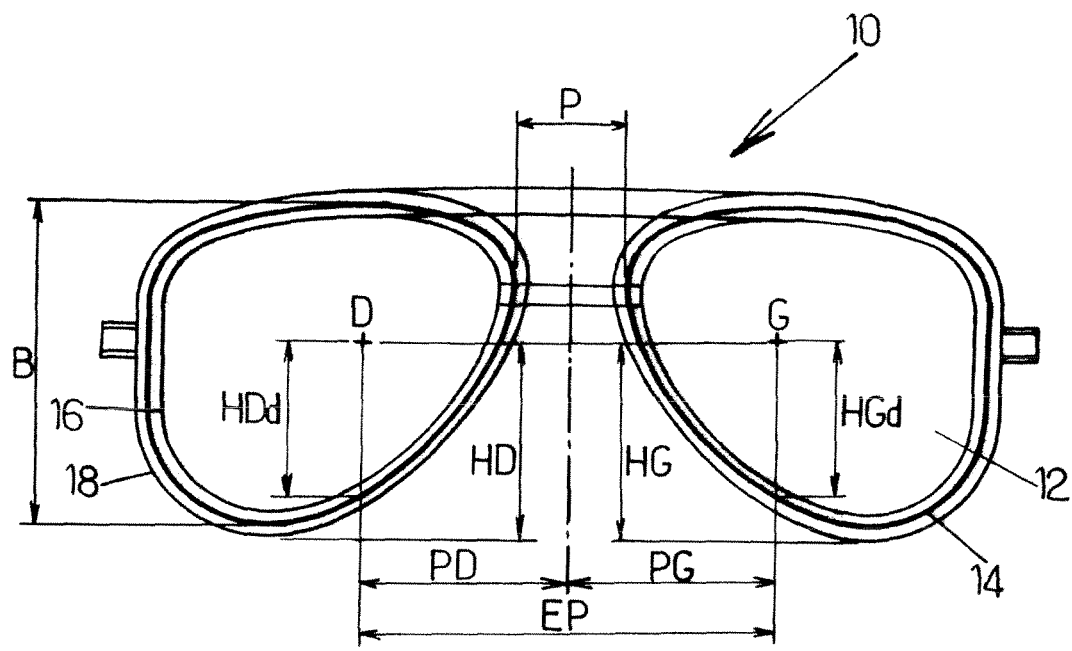
FIG. 1 is the front face of a closed rim spectacle frame.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

In the framework of the invention, the following terms have the meanings indicated herein below:
optical axis of the addition lens: direction perpendicular to the front face of the lens and passing through the optical centre or PRP for progressive lenses of the latter;
distance-vision region: region of the lens that surrounds the distance-vision point, and within which the local optical characteristics of optical power and of astigmatism of the lens are substantially identical to those at the distance-vision point;
near-vision region: region of the lens that surrounds the near-vision point, and within which the local optical characteristics of optical power and of astigmatism of the lens are substantially identical to those of the near-vision point;
addition of a progressive lens: difference between the value of optical power of the lens at the near-vision point and that at the distance-vision point;
optical characteristics of a lens: data on optical power, astigmatism, aberration, etc., relating to the modifications of a light beam that passes through the lens;
prescription: set of optical characteristics of optical power, of astigmatism and, where relevant, of addition, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription for a progressive lens comprises values of optical power and of astigmatism at the distance-vision point and, where appropriate, an addition value;
surface characteristics of a lens: geometrical data relating to one face of the lens, such as values of average sphere or of cylinder, for example;
average sphere, denoted D: (N−1) times the half-sum of the inverses of the two radii of curvature of a surface expressed in meter, denoted R1 and R2, and determined at the same point on the latter. In other words: $D=(N-1)\times(1/R1+1/R2)/2$, where N is the index of refraction of the lens, and
cylinder, denoted C: (N−1) times the absolute value of the half-difference of the inverses of the two radii of curvature of a surface expressed in meter, determined at the same point on the latter. In other words: $C=(N-1)\times|1/R1-1/R2|$;
"height" is used to define a lens or a lens zone dimension corresponding to a vertical when the sight is horizontal;
"width" is used to define a lens or a lens zone dimension corresponding to a horizontal when the sight is horizontal.

FIG. 1 shows a representation of a spectacle frame 10 and the position of the right and left pupils of the wearer in the spectacle frame 10, which are respectively referenced D and G.

The figure shows for the frame 10 the contour of the lens in thick lines 14, and in thin lines the internal 16 and external 18 limits of the spectacle frame 10.

An element, made of plastic or another material, the contour of which corresponds to the bottom of the groove of the spectacle frame, is called the template of the spectacle frame. The template is therefore the external shape that the lens must have once cut out in order to fit in the frame spectacle.

The letter B designates the total height of the template determined with the Boxing system, i.e. according to the ISO8624 standard on systems for the measurement of lenses frames. This height corresponds to the height of a rectangle into which the lens fits once it is cut out.

An element connecting the right and left templates of the frame is called the bridge of the spectacle frame, referenced by letter P in FIG. 1.

The right interpupillary half-distance PD and the left interpupillary half-distance PG refer approximately to half of the distance between the two pupils of the wearer. For the fitting of progressive lenses, an optician measures both interpupillary half-distance PD and PG.

The left half-distance, respectively right, is the distance between the vertical axis of symmetry of the frame and the centre of the left pupil, respectively right.

Right boxing height HD, respectively left boxing height HG, refers to the vertical distance between the right pupil, respectively left and the lowest point of the right half-frame, respectively left height.

For the fitting of progressive lenses, the optician may measure the DATUM heights referenced HDd and HGd in FIG. 1. These right and left reference heights are respectively the distances between the right or left pupil and the right or left intersection between a vertical line passing through the pupil and the frame in its lower part.

The measurements of interpupillary distance and of height of the pupil relative to the frame are carried out for a given position of the wearer, namely for the wearer looking at infinity with his head straight.

The features of a given frame can be measured on the frame, using a device known in the art. For example, US-A-5 333 412 describes a device which makes it possible to measure in 3-dimensions, the shape of the bottom of the groove of the frame. The shape thus determined then makes it possible to calculate the height B.

The features of a frame can also be given directly by the manufacturer according to the model chosen by the wearer.

Using the data thus defined, each lens is cut out such that the fitting cross CM of a progressive lens is situated in the frame facing the pupil of the corresponding eye, when the wearer looks at infinity with his head straight.

Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

Unless specifically stated otherwise, the method according to the invention may apply to any type of spectacle frame, for example metal frames, plastic frames, combination frames, semi-rimless frames, Nylor frames, rimless.

Figure 2A:
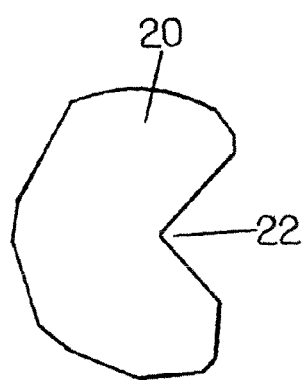
FIGS. 2a and 2b are cross-sections of two type of spectacle frames rims.
Figure 2B:
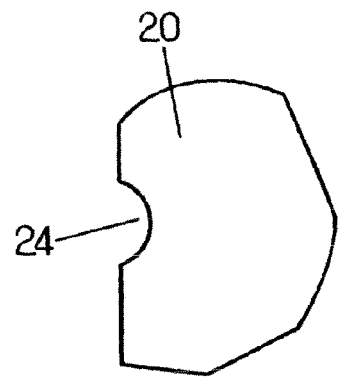

FIGS. 2a and 2b show cross sections of two different rims of spectacle frames.

The rim 20 on FIG. 2a has a V-shaped groove 22, usually corresponding to metal or plastic closed spectacle frame. The lens to be fitted in such closed spectacle frame is bevelled so as to have a corresponding A-shaped bevel (inverse V shape).

The rim 20 on FIG. 2b has a U-shaped groove 24, usually corresponding to semi-rimless spectacle frame. The lens to be fitted in such semi-rimless spectacle frame is bevelled so as to have a corresponding U-shaped bevel and then fitted in the spectacle frame using a retaining cord.

Figure 3:
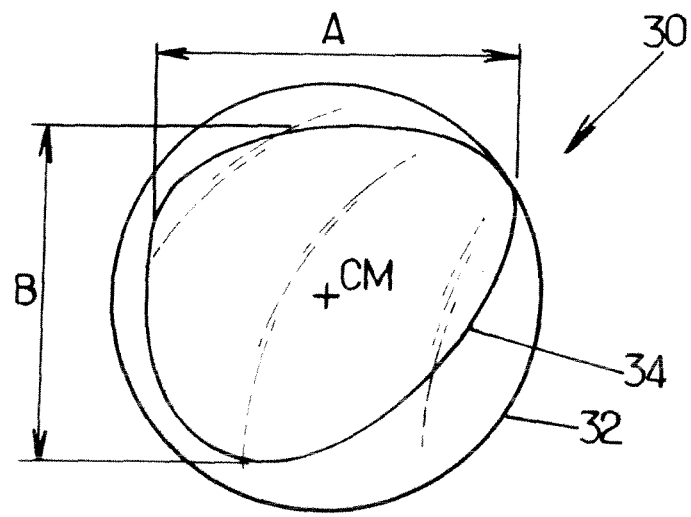
FIG. 3 represents the contour of an ophthalmic lens, before and after edging.

FIG. 3 shows a representation of the contour of an ophthalmic lens, before and after edging. In the figure, the thin line corresponds to the contour of the lens before edging; in a standard manner, the lens has a circular shape. The thick line corresponds to the contour of the template of the frame, which is also the contour of the lens after edging the lens. This edging of the lens followed or combined with a bevelling step allows the subsequent fitting of the lens in the spectacle frame.

FIG. 3 shows the total width A of the template of the frame and the total height B of this template, i.e. the width and the height of the rectangle into which the cut-out lens fits. As explained above, the positioning of the lens in the frame consists in determining the desired position of the lens in the frame, using positioning data, for example notable points of the lens.

For example, the fitting cross of the lens, the medium of micro-marks marked on the surface of the lens, or also the optical centre in the case of a single vision lens can be used. In FIG. 3, the fitting cross or optical center is marked by the cross referenced CM.

For a lens which does not have a rotational symmetry, it is also necessary to carry out an angular positioning of the lens in the frame.

Figure 4:
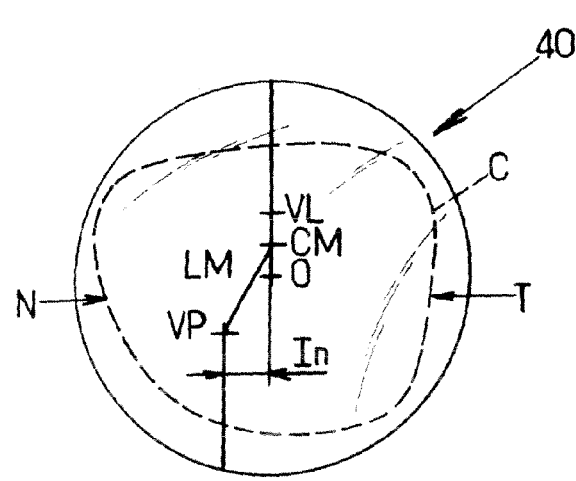
FIG. 4 represents the contour of a progressive additional lens, before and after edging.

FIG. 4 shows schematically an addition lens, before the latter has been edged around a contour C to the dimensions of a frame. In the figure, the nasal and temporal sides of the lens, respectively denoted N and T, the meridian line LM, the distance-vision and near-vision points, respectively denoted VL and VP, the inset In, and an prism reference point (PRP) of the lens, denoted O, are indicated.

Figure 5:
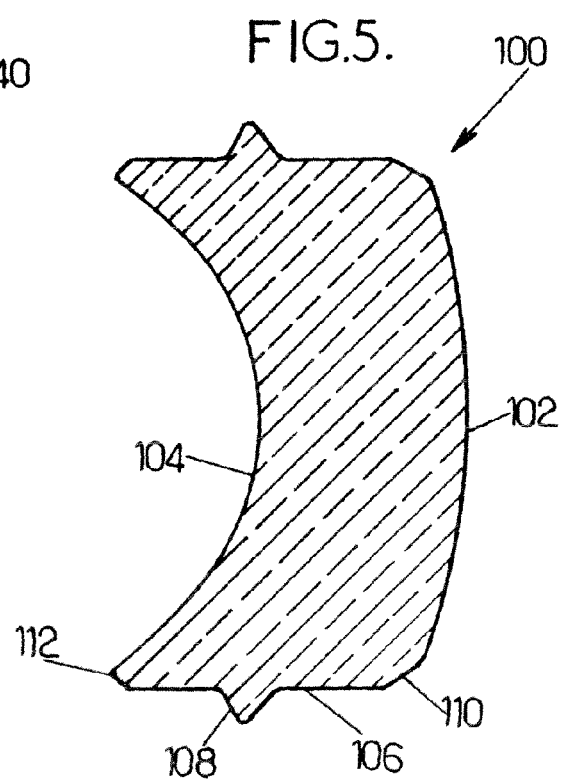
FIG. 5 represents a cross section of an ophthalmic lens edged to fit a closed frame rim.

FIG. 5 shows a cross section of an edged and bevelled ophthalmic lens 100. Such ophthalmic lens presents a front face 102, a rear face 104 and a external periphery 106.

The rear face 104 is the face the closest to the eye of the wearer when the ophthalmic lens is fitted on the frame. Usually the rear face 104 is concave and the front face 102 is convex.

The external periphery 106 is preceded during the edging and bevelling steps. As represented on FIG. 5 the external periphery presents fitting means, in this case a bevel 108. As discussed previously, the geometry of the bevel, in particular its position and shape, depends on the spectacle frame in which the ophthalmic lens is to be fitted.

Optionally, the external periphery of the lens can present a front face counter bevel 110 and a rear face counter bevel 112.

The present invention relates to a method of selecting a semi-finished ophthalmic lens according to a given spectacle frame comprising the steps of:
  providing the spectacle frame front face base data
  providing a list of semi-finished ophthalmic lenses with a plurality of front face bases,
  selecting from the list of semi-finished ophthalmic lenses the semi-finished ophthalmic lens whose front base is the closest from the front base of the spectacle frame.

In the sense of the invention, the final ophthalmic lens may be of any type of known lens, for example uncoloured lens or photochromic lens or solar lens.

According to an embodiment of the invention the semi-finished lens is selected so as to have the average torus of the front face of the semi-finished lens, expressed in refraction index of 1.53, differ by less than 0.5 Diopter, preferably less than 0.2 Diopter, most preferably less than 0.1 Diopter, with the average torus of the front face of the spectacle frame, expressed in refraction index of 1.53.

According to an embodiment of the invention, the list of semi-finished ophthalmic lenses may be obtained by a method for selecting base-curves for an ophthalmic lens according to given prescription data comprising the steps of:
  providing a base-curve series consisting of a plurality of base-curves;
  calculating a target lens according to the prescription data;
  selecting, for at least an optical parameter and/or a geometrical parameter, a threshold value for the difference between the base-curves values and the target lens value of said parameter(s);
  determining the list of the base-curves of the base-curve series where said difference for said parameter(s) is less or equal to the selected threshold value(s).

According to the present invention and thanks to determining a list of possible base-curves for a given prescription, an adequate base-curve can be chosen so as to meet customization criteria.

In the framework of the invention, the following terms have the meanings indicated herein below:

"curvature" of an optical surface is the curvature in a zone or at a specific point of said surface. If the surface is spherical, the curvature is constant and can be determined everywhere. If the surface is a single vision aspheric surface, its curvature is usually measured or determined at the optical center. If the surface is a progressive addition surface, its curvature is usually measured or determined at the distance-vision point. The here above mentioned points are preferred but not limiting points where a curvature according to the present invention can be measured or determined;

a "target lens" has a virtual optical function according to a wearer's prescription and to a chosen design; and a "design" is a widely used wording known from the man skilled in the art to designate the set of parameters allowing to define an optical function of an generic optical system; each ophthalmic lens manufacturer has its own designs, particularly for aspherical lens and for PAL. As for an example, a progressive lens "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms. Progressive lens "designs" are tested through rigorous clinical trials before being commercialized.

According to different embodiments that may be combined:

the target lens is calculated with a front face according to Tscherning ellipses;

a selected parameter is an optical parameter chosen in the list comprising dioptric power, total astigmatism, resulting astigmatism;

the method for calculating the difference of a selected parameter value between the base-curves and the target lens is chosen in the list comprising root mean square (RMS) differences, peak to valley (PV) differences, standard deviation, point to point differences;

a selected parameter is an optical parameter determined at a specific point or in a zone of the lens, as for an example a zone around the optical center or the prism reference point (PRP);

the lens is a progressive addition lens and a selected parameter is an optical parameter determined at a location chosen in the list comprising a zone of the far vision zone, a zone of the near vision zone, a zone of the intermediate vision zone, specific points of the far vision zone, near vision zone, intermediate vision zone, meridian line;

the difference of the values of the selected optical parameter is expressed using diopter units and where the threshold value is comprised between 0.2 and 1 diopter, as for an example less or equal to 0.6 diopter and/or greater or equal to 0.4 diopter;

a selected parameter is a geometrical parameter which is a thickness value at a specific point or in a zone of the lens.

The invention also relates to a method of calculating an optical system (OS) of an ophthalmic lens according to a given spectacle frame. According to a embodiment of the invention such method may comprise the steps of:

providing wearer data,
providing geometrical data of the spectacle frame,
providing deformability data of the spectacle frame,
selecting a semi-finished ophthalmic lens according to the selecting method of the invention,
optimization of the optical system (OS) and the edging parameter according to at least the criteria consisting of the wearer, the geometrical and deformability data so as to generate at least a second optical surface different from the front surface of the ophthalmic lens and the edging parameters.

In the sense of the invention, the final ophthalmic lens may be of any type of known lens, for example uncoloured lens or photochromic lens or solar lens.

In the sense of the invention, the geometrical data include at least contour and shape data.

The contour data may be chosen from, but not limited to, the list comprising:

3 D perimeter of one of the face of the spectacle frame or of the bottom of the groove,
the distance in at least one point between the groove bottom and one of the faces of the spectacle frame.

The shape data may be chosen from, but not limited to, the list comprising:

the tangent at the surface of the front face of the spectacle frame,
a 3D digital representation of the spectacle frame,
the average torus, sphere, cylinder of the front face of the spectacle frame,
the dihedral angle,
the 3D digital representation of the interior profile of the spectacle frame,
the tilt angle of the spectacle frame.

According to the invention, the geometrical data can be obtained by measuring a given spectacle frame using a measuring device well known in the art. Advantageously, the accuracy of the geometrical data is improved. Indeed, although the spectacle frames are produced based on a reference frame, small geometrical differences may exist between a given frame and the reference frame.

The geometrical data can also be obtained from a spectacle frame data base. Advantageously such method is less time consuming.

The geometrical data may also be obtained by a combination of measurements and use of a data base.

According to different embodiment of the invention, the geometrical data may comprise, but is not limited to:

actual contour parameters and a reference shape,
3 dimensional data of the spectacle frame,
2 dimensional data of the spectacle frame and curve data of the spectacle frame,
an internal profile data of the rim of the spectacle frame,
geometrical data of the front face of the spectacle frame.

According to the invention the deformability data of the spectacle frame includes the deformability coefficient $C_d$ of the spectacle lens.

The deformability coefficient $C_d$ may be preset for each frame materials or may be set according to esthetic criteria specified by the wearer.

The deformability coefficient may be expressed in diopter, corresponding to the difference between the average torus of the spectacle frame when deformed and the average torus of the spectacle frame when not deformed, both expressed in refraction index of 1.53.

According to the invention, the wearer data comprise at least the wearer prescription data, and may also comprise elements chosen from, but not limited to, the list comprising:

monocular PD,
fitting point height,
the pantoscopic angle,
the choice of an esthetic criteria, for example: "1:1", "1:2", "Front curve tracing".

The "front curve tracing" is a criterion in which the bevel is formed so as to adjoin the front surface of the lens with the front surface of the spectacle frame.

The "1:1" is a criterion in which the bevel is formed on the external edge of the ophthalmic lens at equidistance of the front and rear face of the ophthalmic lens.

The "1:2" is a criterion in which the bevel is formed on the external edge of the ophthalmic lens so as to have the distance between the bevel and the front face of the lens equal to ½ of the distance between the bevel and the rear face of the lens.

According to the invention, the prescription data may include little or no vision correction. For example, when the ophthalmic lens is a solar lens, the prescription may comprise no vision correction.

In addition to the wearer data the method according to the invention may comprise a step of providing customization data. The customization data may be chosen from, but not limited to, the list comprising:
the style of life of the wearer,
the wearer preference,
the wearer habits.

The optimization step of the method according to the invention may depend on the wearer data and the customization data.

Positioning data may be used to optimize the optical system. According to the invention, the "positioning parameters" include at least the 3D or 2D position of a face of the lens according to the contour of a face of the spectacle frame.

The positioning parameters may be chosen from, but not limited to, the list comprising:
a 3D perimeter of the bevel of the ophthalmic lens,
the distance between the bevel of the ophthalmic lens and the surfaces of one of the face of the ophthalmic lens,
engravings that indicate optical point of reference on one of the surface of the optical lens, for example the PRP.

The optimization step is described in greater details when the optical system is calculated so as to position the front face of the ophthalmic lens according to the front face of the spectacle lens, with the "front curve tracing" esthetic criteria selected.

The optimization step according to the invention comprises first the optimization of an optical surface of the ophthalmic lens different from the front surface of the ophthalmic lens. The optimization step also comprises the optimization of the edging parameters associate with the selected semi-finish lens and spectacle frame.

In the sense of the invention edging parameters include at least the 2D or 3D position and shape of the bevel on the external profile of the ophthalmic lens.

The edging parameters include at least a calculated bevel respecting: $|C_b-C_f| \leq C_d$, the curvature of the bevel, $C_f$ the curvature of the front face of the spectacle frame, $C_l$ the curvature of the front face of the ophthalmic lens and $C_d$ the deformability coefficient of the spectacle frame. The bevel may be calculated with respect to an edge of the spectacle lens according to a specified design mode and the curve of the bevel being:

$C_b = C_f$ when $|(C_f - C_l)| \leq C_d$ $C_b = C_f - C_d$ when $|C_f - C_l| > C_d$ and $C_f - C_l < 0$ $C_b = C_f + C_d$ when $|C_f - C_l| > C_d$ and $C_f - C_l > 0$ The optimization step may include generating the edging parameters.

During the optimization step of the method according to the invention the generated optical surface may be chosen from the list comprising:
the rear surface of the lens,
a diopter surface between the front and rear surface of the lens.

The application WO 2007/017766 teaches a method when having a first surface of an optical system to calculate a second surface of the optical system according to a given prescription.

According to the method disclosed in WO 2007/017766 the optical system (OS), for example of an ophthalmic lens, is identified by a optical function (OF), at least two optical surfaces comprise a first optical surface (S1), for example the front surface of the ophthalmic lens or the semi-finished lens, defined by a first equation (ES1) and a second surface (S2), for example the rear surface of the ophthalmic lens, defined by a second equation (ES2). The method disclosed in WO 2007/017766 further comprises:
a generating step (GEN), in which a virtual optical system (VOS) is used to generate a virtual function (VOF);
a modification step (MOD), in which the virtual function (VOF) is modified so as obtain the function (OF);
a calculation step (CAL), in which the second equation (ES2) is calculated from the function (OF), and the first equation (ES1).
Therefore according to the method of the invention the semi-finished lens is selected based according to the front face of the spectacle frame and the rear face of the selected semi-finished lens can be generated based on the wearer prescription and the geometry of the front face of the selected semi-finished lens, using the method disclosed in WO 2007/017766.

In the different embodiments describe hereafter, the positioning parameter are generated according to positions criteria of the ophthalmic lens in the spectacle frame. The rear face of the ophthalmic lens and/or a diopter surface between the front an rear face of the ophthalmic lens are generated according not only the geometry of the front surface of the lens but also according to optical criteria, in particular to the wearer prescription.

Figure 6:
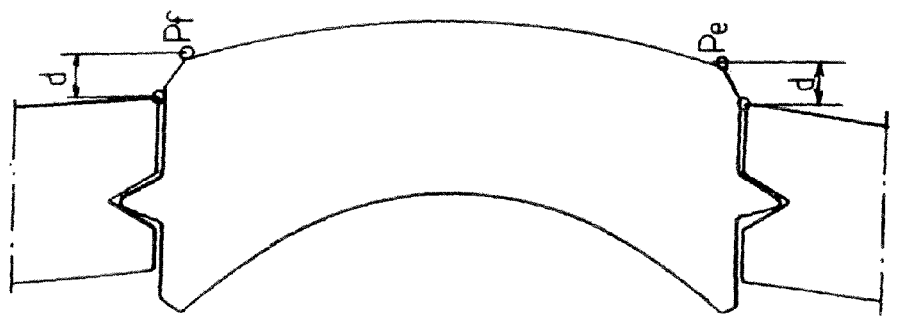

According to an embodiment, illustrated on FIG. 6, the optical system and the edging parameter of the ophthalmic lens are calculated so as to position the front face of the ophthalmic lens at a given distance from the front face of the spectacle frame.

The given distance can be chosen by the wearer according to esthetic criteria, if not esthetic criterion is specified it can be considered that the "front curve tracing" criterion is applied.

The "front curve tracing" criteria corresponds to the distance between the front face of the spectacle frame and the front face of the lens as small as possible.

According to an embodiment where the "front curve tracing" criteria has been chosen, the positioning parameter of the ophthalmic lens are calculated so as to have the distance d between the Pf and Pl be smaller than 1 mm, preferably smaller than 0.5 mm, preferably smaller than 0.1 mm.

Pf being the junction point between the front face of the spectacle frame and the internal profile of the spectacle frame.

Pl being the junction point between the front face of the ophthalmic lens and the external profile of the ophthalmic lens.

The distance d is calculated in a cross-section, therefore, the criterion should be continually applied for most of the cross sections of the spectacle frame, for example more than 50%, more than 70%, more than 80%, more than 90%, substantially 100%.

In this embodiment the curvature of the front face of the spectacle frame is measured using a measuring device at the optician side.

The front face of the semi-finished lens is selected by the lens manufacturer using a selection method according to the invention.

The bevel is calculated so as to have a curvature $C_b$:

$C_b = C_f$ when $|C_l - C_f| \leq C_d$ $C_b = C_f - C_d$ when $|C_l - C_f| > C_d$ and $C_l - C_f < 0$ $C_b = C_f + C_d$ when $|C_l - C_f| > C_d$ and $C_l - C_f > 0$ with $C_b$ the curvature of the bevel, $C_f$ the curvature of the front face of the spectacle frame, $C_l$ the curvature of the front face of the ophthalmic lens and $C_d$ the deformability coefficient of the spectacle frame.

Figure 9:
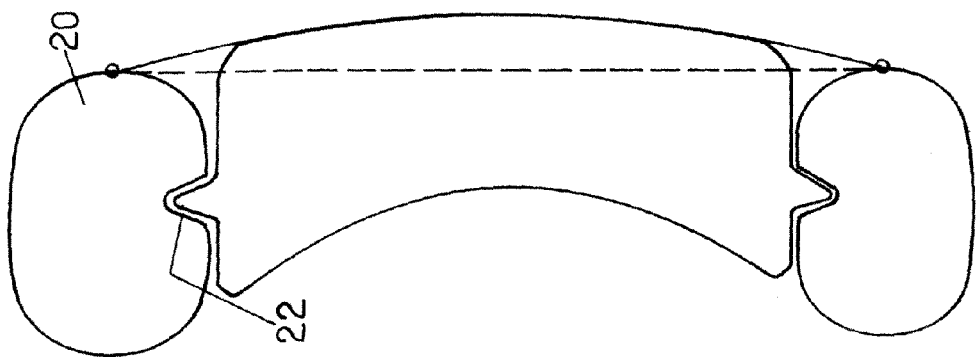
FIGS. 6 to 9 represents cross-sections of an ophthalmic lens fitted in a spectacle frame, the optical system of the ophthalmic lens have been calculated according to different criteria.
Figure 8:
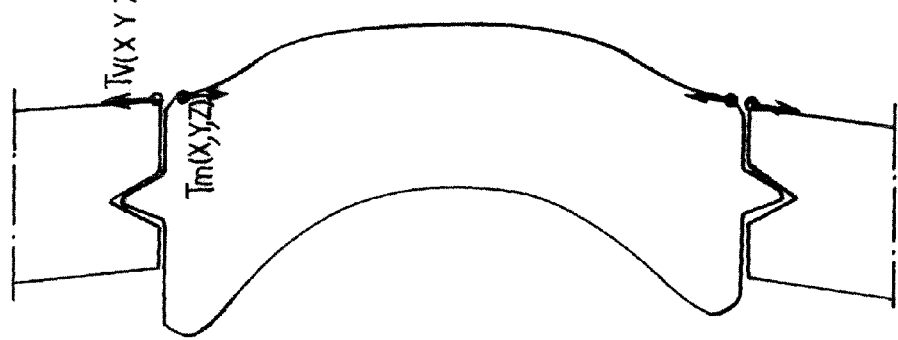
Figure 7:
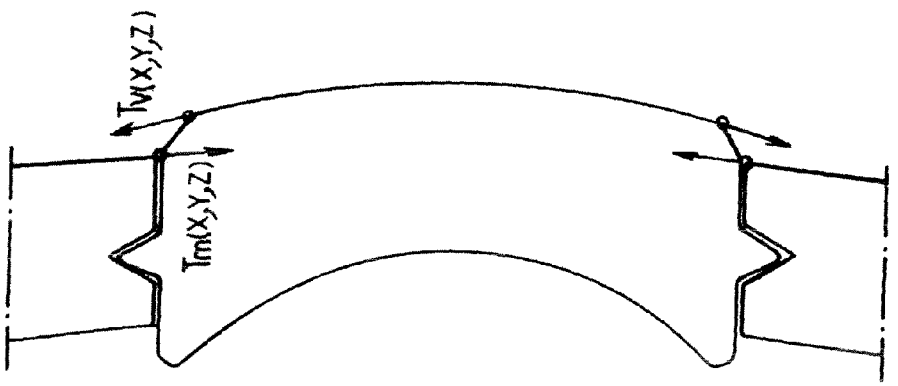

FIGS. 7 to 9 illustrate different ways of defining the difference between the front face of the ophthalmic lens and the front face of the spectacle frame.

As illustrated on FIG. 7, the difference between the front face of the ophthalmic lens and the front face of the spectacle frame may be expressed with the angle between Tf and Tl, which is smaller than 15°, preferably smaller than 10°, and more preferably smaller than 5°.

Tf being the tangent to the front face of the spectacle frame at the point Pf. Pf being the junction point between the front face of the spectacle frame and the internal profile of the spectacle frame.

Tl being the tangent to the front face of the ophthalmic lens at the point Pl. Pl being the junction point between the front face of the ophthalmic lens and the external profile of the ophthalmic lens.

The angle is calculated in a cross-section, therefore, the criteria should be continually applied for most of the cross sections of the spectacle frame, for example more than 50%, more than 70%, more than 80%, more than 90%, substantially 100%.

FIG. 8 illustrates a situation where the distance d between Pf and Pl and the angle between Tf and Tl are close to zero. When such a configuration is continually applied to most of the cross-sections can be considered as having the front face of the ophthalmic lens as abutting the front face of the spectacle lens.

As illustrated on FIG. 9, the difference between the front face of the ophthalmic lens and the front face of the spectacle frame may be expressed as the average torus of the front face of the ophthalmic lens (having a refractory index of 1.53) differing by less than 0.5 Diopter, preferably less than 0.25 Diopter, most preferably less than 0.12 Diopter, with the average torus of the front face of the spectacle frame.

In some embodiments the average torus can be close to a sphere.

FIG. 9 illustrates a situation where the average torus of the front face of the ophthalmic lens is sensibly equal to the average torus of the front face of the spectacle frame. When such a configuration is continually applied to most of the cross-sections can be considered as having the front face of the ophthalmic lens as abutting the front face of the spectacle lens.

The invention has been described above with the aid of an embodiment without limitation of the general inventive concept; in particular the optimization criteria are not limited to the examples discussed.

The invention claimed is:

1. A method of selecting a semi-finished ophthalmic lens according to a given spectacle frame comprising the steps of:
providing, at a processor, the spectacle frame front face base data;
providing, at the processor, a list of semi-finished ophthalmic lenses with a plurality of front face bases; and
selecting, by the processor, from the list of semi-finished ophthalmic lenses a semi-finished ophthalmic lens whose front base is the closest to the front base of the spectacle frame, wherein the semi-finished lens is selected such that the average curvature of the front face of the semi-finished lens, differs by less than 0.5 Diopter from the average curvature of the front face of the spectacle frame, with the average curvature of the front face of the semi-finished lens and the average curvature of the front face of the spectacle frame both being expressed in terms of Diopters for an index of refraction of 1.53.

2. The method according to claim 1, wherein the list of semi-finished ophthalmic lenses is obtained by a method for selecting base-curves for an ophthalmic lens according to given prescription data comprising the steps of:
providing, at the processor, a base-curve series consisting of a plurality of base-curves;
calculating, by the processor, a target lens according to the prescription data;
selecting, by the processor for at least an optical parameter and/or a geometrical parameter, a threshold value for the difference between the base-curves values and the target lens value of said parameter(s); and
determining, by the processor, the list of the base-curves of the base-curve series where said difference for said parameter(s) is less or equal to the selected threshold value(s).

3. The method according to claim 2, wherein the geometrical data are obtained by measuring a spectacle frame.

4. The method according to claim 2, wherein the geometrical data are obtained from a spectacle frame data base.

5. The method according to claim 2, wherein the geometrical data comprise contour parameters and a reference shape.

6. The method according to claim 2, wherein the geometrical data comprises an internal contour data of the rim of the spectacle frame.

7. The method according to claim 2, wherein geometrical data of the spectacle lens further comprise geometrical data of the front face of the spectacle lens.

8. A method of calculating an optical system of an ophthalmic lens according to a given spectacle frame comprising the steps of providing wearer data, selecting a semi-finished ophthalmic lens according to the method of claim 1, and optimization, by the processor, of the optical system according to at least the criteria consisting of the wearer data, so as to generate at least a second optical surface different from the front surface of the ophthalmic lens.

9. The method according to claim 8, wherein during the optimization step edging parameter are generated.

10. The method according to claim 8, wherein before the optimization step the method further comprises a step of providing, by the processor, deformability data of the spectacle frame, and the optimization step further comprises a step of optimization of edging parameter according to at least the criteria consisting of the geometrical and deformability data of the spectacle lens and the wearer data.

11. The method according to claim 8, wherein before the optimization step the method further includes a step of providing an edging mode.

12. The method according to claim 8, wherein the optimization criteria further comprises the index of refraction of the optical system.

13. The method according to claim 8, wherein optimization criteria further comprises the thickness of the spectacle lens.

14. The method according to claim 8, wherein the ophthalmic lens is a mutifocal ophthalmic lens.

15. The method according to claim 8, wherein the ophthalmic lens is a monofocal ophthalmic lens.

16. The method according to claim 8, wherein the optical system is identified by a optical function, at least two optical surfaces comprise a first optical surface defined by a first equation and a second surface defined by a second equation, the optimization step further comprises:
    a generating step (GEN), in which a virtual optical system is used to generate a virtual function;
    a modification step, in which the virtual function is modified so as obtain the function; and
    a calculation step, in which the second equation is calculated from the function, and the first equation.

17. An ophthalmic lens manufacturing method comprising the steps of:
    receiving geometrical data of a spectacle frame,
    receiving an optical system of an ophthalmic lens data calculated using a method according to claim 3, and
    manufacturing the calculated ophthalmic lens.

18. The method according to claim 17, wherein the spectacle frame is selected at a lens order side and the geometrical data are transmitted to a computing device installed at a lens manufacturer side where the calculation steps are processed.

19. The method according to claim 17, wherein during the optimization step edging parameters are generated, and wherein the spectacle frame is selected at a lens order side and after being manufactured at a lens manufacturer side, the ophthalmic lens is transmitted to the order side with the edging parameters.

20. The method according to claim 17, wherein the spectacle frame is selected at a lens order side and after being manufactured at a lens manufacturer side, the ophthalmic lens is edged and the edged ophthalmic lens is sent to the order side.

21. The method according to claim 17, wherein the manufactured spectacle lens when edged is fitted in the selected spectacle frame.

22. An ophthalmic lens ordering method comprising the steps of:
    selecting a spectacle frame,
    ordering at a lens manufacturer an ophthalmic lens manufactured according to claim 17, and
    fitting the edged ophthalmic lens in the selected spectacle frame.

23. A computer program stored on a computer memory and executing on a processor which, when used on a computer apparatus causes the processor to execute a method of selecting a semi-finished ophthalmic lens according to a given spectacle frame, the method comprising the steps of
    providing the spectacle frame front face base data;
    providing a list of semi-finished ophthalmic lenses with a plurality of front face bases; and
    selecting from the list of semi-finished ophthalmic lenses a semi-finished ophthalmic lens whose front base is the closest to the front base of the spectacle frame, wherein the semi-finished lens is selected such that the average curvature of the front face of the semi-finished lens differs by less than 0.5 Diopter from the average curvature of the front face of the spectacle frame, with the average curvature of the front face of the semi-finished lens and the average curvature of the front face of the spectacle frame both being expressed in terms of Diopters for an index of refraction of 1.53.

24. A non-transitory computer readable medium storing a computer program which when executed by a processor on a computer apparatus causes the processor to execute a method of selecting a semi-finished ophthalmic lens according to a given spectacle frame, the method comprising the steps of:
    providing the spectacle frame front face base data;
    providing a list of semi-finished ophthalmic lenses with a plurality of front face bases; and
    selecting from the list of semi-finished ophthalmic lenses a semi-finished ophthalmic lens whose front base is the closest to the front base of the spectacle frame, wherein the semi-finished lens is selected such that the average curvature of the front face of the semi-finished lens differs by less than 0.5 Diopter from the average curvature of the front face of the spectacle frame, with the average curvature of the front face of the semi-finished lens and the average curvature of the front face of the spectacle frame both being expressed in terms of Diopters for an index of refraction of 1.53.

* * * * *